United States Patent [19]

Bruhn

[11] Patent Number: 4,478,198
[45] Date of Patent: Oct. 23, 1984

[54] FUEL TREATING APPARATUS FOR INTERNAL COMBUSTION ENGINES

[76] Inventor: Larry C. Bruhn, P.O. Box 594, Springfield, Oreg. 97477

[21] Appl. No.: 466,050

[22] Filed: Feb. 14, 1983

Related U.S. Application Data

[63] Continuation-in-part of Ser. No. 373,517, Apr. 30, 1982, abandoned.

[51] Int. Cl.³ ............................................. F02M 31/00
[52] U.S. Cl. ..................................... 123/548; 123/545; 123/590; 261/144
[58] Field of Search ............... 123/548, 545, 546, 590; 261/144, 145, DIG. 55; 165/52

[56] References Cited

U.S. PATENT DOCUMENTS

| 668,953 | 2/1901 | Dawson . | |
|---|---|---|---|
| 1,245,519 | 11/1917 | Smith | 123/545 |
| 1,449,333 | 3/1923 | Lamb | 123/545 |
| 1,553,477 | 9/1925 | Smith . | |
| 1,782,602 | 11/1930 | Brush | 123/590 |
| 1,945,178 | 1/1934 | Carter | 123/546 |
| 2,319,752 | 5/1943 | Smith | 123/545 |
| 3,911,882 | 10/1975 | Thornburgh . | |
| 3,951,116 | 4/1976 | Nakada . | |
| 4,044,741 | 8/1977 | Swingley | 261/145 |
| 4,092,966 | 6/1978 | Prosen | 123/590 |
| 4,130,099 | 12/1978 | Ferguson | 123/590 |
| 4,151,820 | 5/1979 | Furacz | 123/545 |
| 4,153,029 | 5/1979 | Ikegaya | 123/590 |
| 4,167,165 | 9/1979 | Finlay . | |
| 4,167,166 | 9/1979 | Varner . | |
| 4,188,928 | 2/1980 | Faustinos . | |
| 4,192,270 | 3/1980 | Beckman | 261/145 |
| 4,200,070 | 4/1980 | Racine | 123/547 |
| 4,212,274 | 7/1980 | Quick | 123/548 |
| 4,300,513 | 11/1981 | Ray | 123/545 |
| 4,338,906 | 7/1982 | Cox | 123/144 |

FOREIGN PATENT DOCUMENTS

| 2350037 | 5/1975 | Fed. Rep. of Germany | 123/545 |
|---|---|---|---|
| 937272 | 4/1948 | France | 165/52 |

Primary Examiner—Ronald H. Lazarus
Attorney, Agent, or Firm—Eugene M. Eckelman

[57] ABSTRACT

A housing has an inlet arranged to be connected to the outlet of a fuel mixing device of an internal combustion engine such as a carburetor and an outlet arranged to be connected to the intake manifold of the engine. In a preferred embodiment of the invention, the housing has two or more spiral bores. These bores have a cross sectional area less than the cross sectional area of the outlet of the carburetor to provide increased time and velocity through the spiral bores and to isolate the carburetor from vacuum pulsations of the engine. The defining surfaces of the spiral bores is roughened to increase atomization. A second embodiment utilizes an elongated housing also having a spiral path for mixing the fuel and air. This latter housing has a longitudinal bore which also increases the velocity of flow of fuel and air mixture through the housing and includes a vacuum controlled valve arranged upon decreased vacuum to allow direct flow of fuel to the intake manifold in bypassing relation for providing a heated area around the spiral path, such casing being arranged to be connected into the exhaust manifold for using the heat therefrom.

2 Claims, 6 Drawing Figures

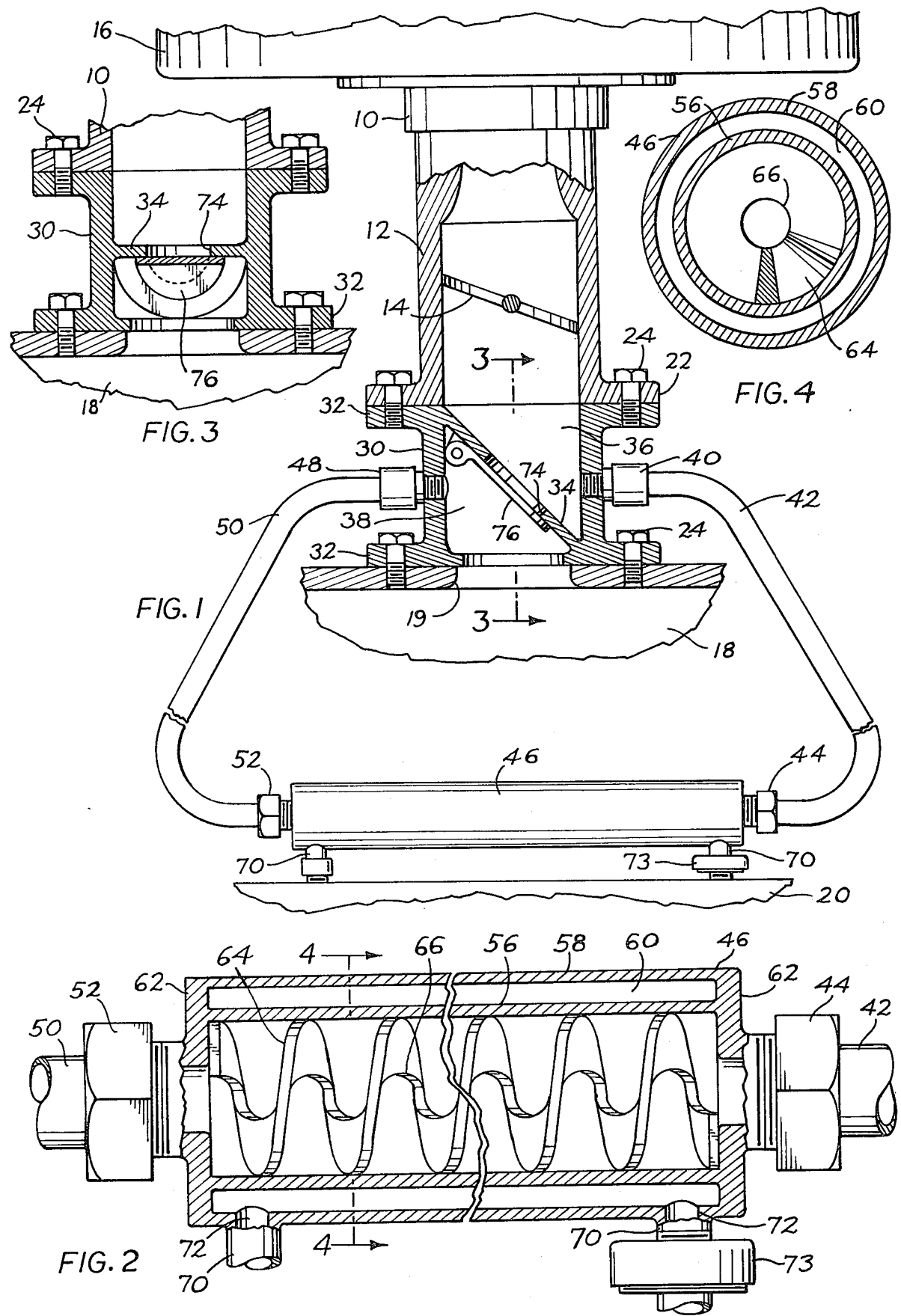

FUEL TREATING APPARATUS FOR INTERNAL COMBUSTION ENGINES

REFERENCE TO PRIOR APPLICATION

This is a continuation-in-part of application Ser. No. 373,517 filed Apr. 30, 1982, now abandoned.

BACKGROUND OF THE INVENTION

This invention relates to apparatus for treating fuel for internal combustion engines and more particularly is concerned with apparatus that provides for improved atomization of the air-fuel mixture.

In connection with the operation of internal combustion engines, the advantages of efficient fuel utilization are well known, namely, the vehicle gets increased fuel mileage and less pollution is emitted both to the atmosphere, and into the crankcase oil. In addition, the engine operates at a reduced temperature to provide better performance and longer engine life. Also, the engine has better low end torque and is easier to start.

As is also well known, poor mileage and other undesirable conditions are generally due to poor atomization. This is because fuel when fed into the intake manifold in droplet form rather than in a vaporous form is not fully combustible, and since a good share of the fuel fed to the pistons by existing systems is still in droplet form and does not burn completely, an excess richness of the fuel mixture is present for poor mileage as well as for excess pollution and overheating.

In addition to the above known inefficiency of fuel usage, it is believed by applicant that less efficiency results from the direct and cold emission of the fuel mixture of the carburetor into the manifold. In addition to there being incomplete atomization in such a case, the vacuum feeding force on the fuel mixture resulting from the operation of the pistons and valve overlap causes intermittent flow or air pulsations, particularly at slow speeds or idling, thus resulting in spasmodic or uneven flow of fuel and consequently spasmodic or uneven operation of the motor.

Prior devices have been conceived for increasing the atomization or vaporization of the fuel but such devices are not considered to be fully effective in preparing the fuel mixture for efficient combustion and also for otherwise presenting such mixture to the combustion chambers for the most efficient operation of the engine. For example, devices have been conceived that heat the fuel mixture in order to vaporize such mixture. Also, devices have been conceived, such as deflecting means, for mixing the mixture to increase the atomization. While prior devices are available that produce good mileage, such devices do not at the same time give satisfactory drivability through the full rpm range because of the lack of power and torque.

SUMMARY OF THE INVENTION

According to the present invention and forming a primary objective thereof, fuel treating apparatus for internal combustion engines is provided that increases fuel utilization so as to give better mileage and at the same time to provide good drivability through a full rpm range.

Another object is to provide apparatus of the type described which not only achieves the above objects but also reduces exhaust emissions.

Still another object of the invention is to provide apparatus of the type described that isolates the carburetor from air pulsations caused by piston and valve operation for providing an even flow of the fuel mixture to all the pistons.

Another object is to provide apparatus of the type described that is arranged to have controlled heat therefor to provide effective atomization of the fuel mixture.

Other objects of the invention are to provide apparatus of the type described that is disposed between the fuel feed means such as the carburetor and the intake manifold, thus providing an arrangement which does not interfere with the ability to adjust the richness or leanness and also not to interfere with the PCV and EGR valves, automatic choke, accelerator pump and other existing equipment.

The objects of the invention are accomplished by fuel treating apparatus having an inlet arranged to be connected to the outlet of the fuel feed means such as the carburetor and an outlet arranged to be connected to the inlet of the intake manifold. A first embodiment of the apparatus includes an elongated tubular housing having a spiral or auger-type path through which the fuel and air from the carburetor passes. Important to the function of the invention, the elongated spiral path subjects the fuel to a centrifugal action which provides for some of the efficient mixing of the invention between air and the fuel. Also important to the function of the present apparatus is the provision of a central longitudinal bore through the spiral path which is of less diameter than the inlet and outlet to the housing, thus causing increased velocity through such bore to provide an additional atomization of the fuel mixture. Still further efficient fuel mixing is accomplished by using controlled heat from the cooling system or exhaust to offset the refrigerating effect resulting from the mixing of the fuel mixture moving through the spiral path. The apparatus includes an outer casing on the housing through which emissions from the exhaust manifold or water system are circulated under controlled conditions to produce the heat desired. In a second embodiment of the invention, centrifugal movement of the fuel mixture is provided by two or more spiral paths which similarly increase the velocity of the mixture between the carburetor and intake manifold to provide the improved atomization. Heat in this embodiment is provided by hot liquid circulating in an outer casing on the apparatus, such liquid preferably being supplied from the vehicle coolant system. The surface of the spiral paths is roughened for providing an efficient atomization.

The invention will be better understood and additional objects and advantages will become apparent from the following description taken in connection with the accompanying drawings.

BRIEF DESCRIPTION OF THE DRAWINGS

FIG. 1 is an elevational view, with parts broken away, of a first embodiment of the fuel treating apparatus of the invention, such apparatus being shown installed in association with a conventional carburetor, intake manifold, and exhaust manifold;

FIG. 2 is an enlarged longitudinal sectional view of the tubular housing of FIG. 1 which provides an efficient atomization of the fuel mixture;

FIG. 3 is an enlarged fragmentary sectional view taken on the line 3-3 of FIG. 1;

FIG. 4 is a sectional view taken on the line 4—4 of FIG. 2;

DETAILED DESCRIPTION OF A PREFERRED EMBODIMENT

Figure 5:
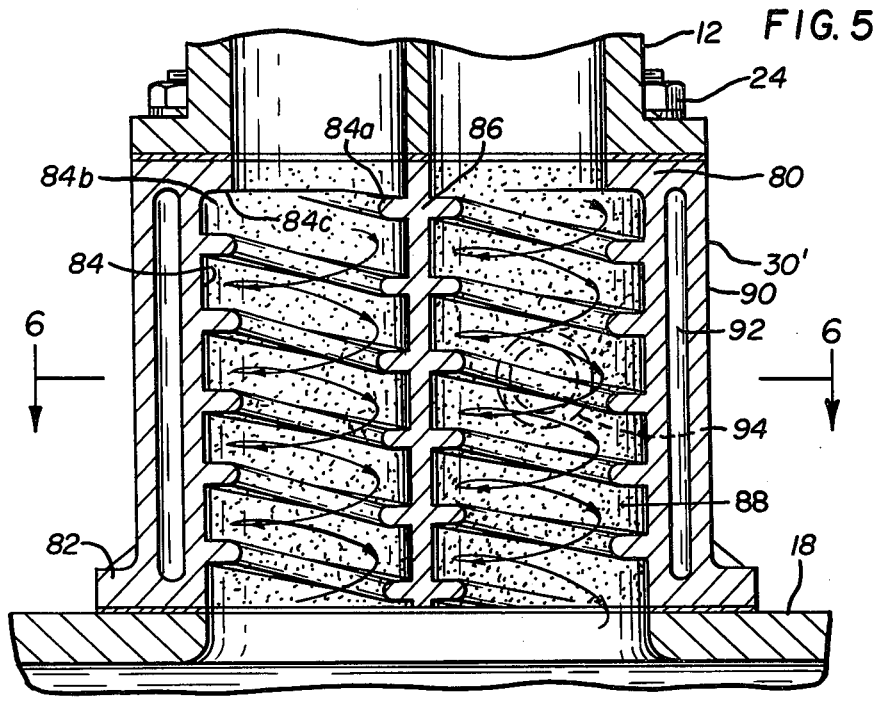
FIG. 5 is an elevational view, with parts broken away, of a second embodiment of the invention.

With particular reference to the drawings, and first to FIG. 1, a first embodiment of fuel treating apparatus of the invention is shown in combination with a conventional carburetor 10 having the usual barrel portion 12, control valve 14, and air filter housing 16. The numeral 18 designates the usual intake manifold having an inlet opening 19. The numeral 20 designates the exhaust manifold. In conventional structure, the carburetor is bolted or otherwise secured to the intake manifold 18 and for this purpose, the lower portion of the carburetor may include a flange 22 for suitable bolts 24. Although a carburetor type fuel mixing device is illustrated in association with the present invention, is it to be understood that the invention may be used with substantially any other type of fuel mixing or feed devices. It is further to be understood that the present device may itself comprise the fuel feed means and thus is not to be limited to use with a carburetor or other fuel mixing device.

In the apparatus of the invention shown, an insert 30 is provided which has flanges 32 arranged to be bolted between the carburetor 10 and the intake manifold 18, thus providing an extension of the carburetor barrel into the intake manifold. Insert 30 is open-ended and has a hollow interior divided by a diagonal wall 34 forming two compartments 36 and 38.

In the installed position of the insert 30, compartment 36 communicates with the carburetor and is associated with a fitting 40 for a conduit 42 having a fitted 44 at its other end with the inlet end of a fuel treating housing 46 to be described hereinafter. Compartment 38 communicates with openings 19 in the intake manifold and is associated with a fitting 48 for a conduit 50 having a fitting 52 at its other end connected into the outlet end of the fuel treating housing 46.

The structure of housing 46 is detailed in FIG. 2 and comprises an elongated tubular member having an inner barrel portion 56 and an outer casing portion 58. An enclosed space 60 is formed between the portions 56 and 58. Housing 46 has end walls 62 which receive the fittings 44 and 52 and also form an end closure for the space 60.

Barrel 56 houses a spiral or auger-type baffle 64 leading from one end thereof to the other and arranged to provide a swirling motion to the fuel mixture entering from conduit 42. The spiral baffle 64 has a central longitudinal bore or opening 66 therethrough. This bore has a diameter less than the inlet 44 and outlet 52 to provide increased velocity through this center portion of the barrel 56. A volume relationship which increases the velocity through this bore has been found to achieve effective results.

It is preferred that heat be applied to the fuel mixture as it moves through the housing 46 for the purpose of offsetting the refrigerating effect of the gases being mixed in the barrel 56, and for this purpose, such housing may be mounted on, in, or closely adjacent to the exhaust manifold 20 and include connections 70 arranged to be associated with suitable bores 72 provided in the exhaust manifold. Connections 70 open into the space 60 between the barrel 56 and the outer casing 58 whereby exhaust gases are arranged to circulate in such space and heat the barrel 56. The flow of exhaust gases through the space 60 is controlled by a thermostatically operated valve 73 associated with one of the connections 70, it being desired that sufficient heat be applied to offset the refrigerating effect as noted above but not to the extent to provide undesirable vaporization. It is to be understood that connections 70 may be associated with the vehicle liquid coolant system whereby the heated coolant from the engine would supply the heat for the apparatus.

Diagonal wall 34 of the insert 34 has an opening 74 covered from the underside by a valve 76 having spring biased closure against the wall 34 and arranged such that under light and normal load conditions the valve is held closed but under heavy load conditions and consequent decreased vacuum it will be open to allow direct passage of fuel mixture from the carburetor into the intake manifold.

In the operation of the structure of FIGS. 1–4, the fuel mixture from the carburetor enters the compartment 36 and travels to the inlet end 44 of the housing 46 through the conduit 42. Such mixture, in its forced travel from the vacuum created by the pistons and valves, has a swirling motion through the spiral-type baffle 64 and also has the increased velocity flow straight through the bore 66.

The swirling motion of the fuel mixture from one end of the housing to the other subjects the fuel to a rather violent centrifugal action for accomplishing good atomization of the fuel. The effecive atomization is also increased by the speeded up velocity of a portion of the mixture straight through the reduced size bore 66, and of course further effective treatment, short of vaporization, results from the heated condition of the barrel 56. A preferred temperature of the fuel mixture is approximately 100° F., and conditions are sought to maintain approximately this range. It is also preferred, and as noted on the drawings, that the housing 46 be elongated to provide an effective atomization of the air and fuel. This elongated path gives additional time for the fuel particles to break up and the air fuel mixture to mix for efficient combustion. Such path also isolates the carburetor from the normal vacuum pulsations caused by the pistons and valves, whereby the infeed to the carburetor comprises an even flow rather than a spasmodic flow as now exists in internal combustion engines. Such elongated mixing area also prevents backfire since there is room for misfired fuel to expand. An exemplary lineal path of 40 inches including the spiral 64 has been found to be very effective. The exact length of the lineal path of the mixing area will vary, however, depending upon the amount of turbulence. The length of the path may be shortened with the use of heat in space 60. The relationship of distance of movement of the air fuel mixture, the temperature of the mixture, and the amount of turbulence are all combined selectively for the most efficient combustion.

Figure 6:
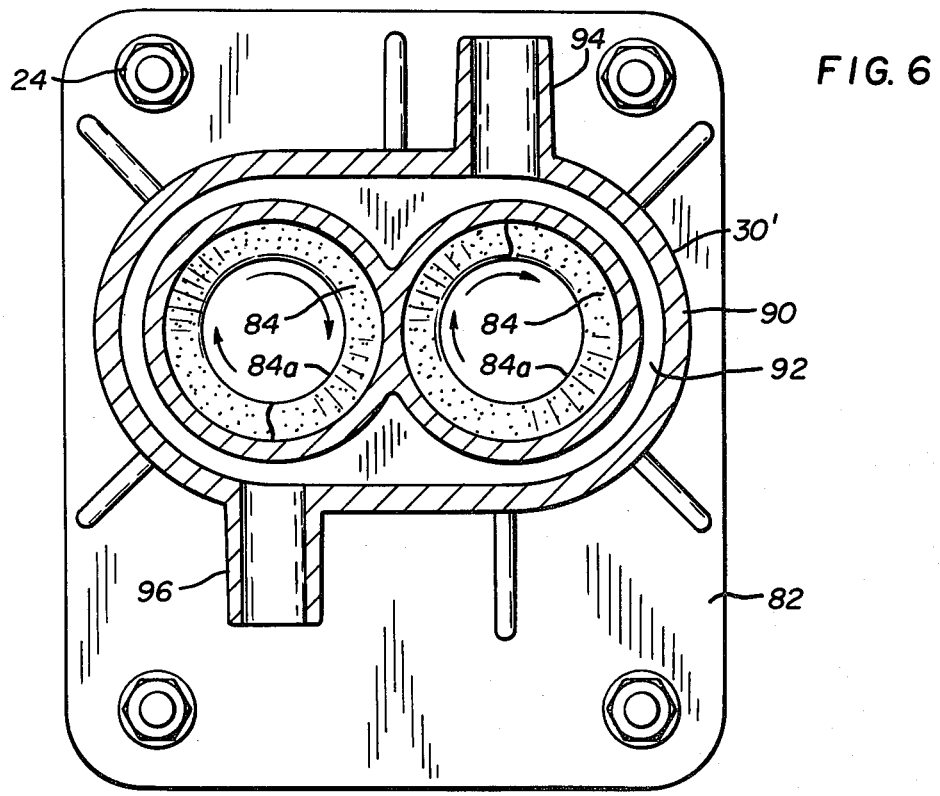
FIG. 6 is a horizontal sectional view taken on the line 6—6 of FIG. 5.

In the embodiment of FIGS. 5 and 6, and insert 30' is provided having a top wall 80 for securement to the carburetor 12, as by bolts 24, and a bottom wall 82 for securement to the manifold 18, also by bolts 24. Insert 30' has a pair of straight vertical bores 84 separated by a central partition 86. The defining surfaces of bores 84 assume a spiral configuration or groove whereby fuel mixture from the carburetor will develop a swirling motion through the insert 30' so as to subject the mixture to centrifugal action. These bores are unobstructed in the area defined by the outer groove. As best seen in FIG. 5, the spiral configuration of the bores 84 provides a protrusion 84a on one side and a cavity 84b under a ledge 84c on the other side. Such initiates the swirling motion of the fuel mixture in an efficient manner in that the mixture first impinges against the protrusion 84a without resistance from the other side, namely, in the area of cavity 84b. The mixture is also speeded up as it passes through the spiral bores 84 since the combined cross sectional area of the two bores is preselected to be less than the outlet area of the carburetor. The high velocity spiral movement of the mixture propels the larger fuel droplets outwardly which causes them to break up when they impinge against the outer walls. The spiral path also provides other areas which comprise impingement surfaces to break up the droplets. The spiral pattern is such to provide at least two, and preferably more, complete revolutions of the mixture. Any number of the spiral bores 84 may be provided. For example, one of the bores may be provided for each barrel of the carburetor, such as two bores for a two barrel carburetor as shown in FIG. 5, or four bores for a four barrel carburetor. It is to be understood, however, that two or more bores function effectively with a lesser number of barrels of the carburetor such as two of the bores in association with a single barrel carburetor or two or more bores with a greater number of barrels such as two bores with a four barrel carburetor.

The dual spiral path of the fuel mixture through the insert 30' also isolates the carburetor from the normal vacuum pulsations caused by the pistons and valves whereby the infeed to the carburetor comprises an even rather than a spasmodic flow, namely, a concept which is similar to the turbo muffler concept. The required lineal path provided by the two or more spiral bores accomplishes this function.

Important to the invention, the defining surfaces of bores 84 are roughened, for example, a sand-like finish. Such a roughened surface is designated by the numeral 88 and causes more deflection of the fuel mixture particles to provide a most effective atomization. Such a roughened surface can be readily accomplished by casting the insert in a sand mold, or by other methods.

Insert 30' also has means for applying heat to the fuel mixture for this purpose has an outer casing 90 around the inner portion forming an enclosed space 92. The insert has a pair of oppositely disposed hose connecting projections 94 and 96 with central bores leading into the space 92. These projections are arranged to connect with conventional heater hoses of a vehicle whereby to utilize the vehicle coolant system for circulation of the coolant through the space 92. Heat from the coolant thus heats the fuel mixture for offsetting the refrigerating effect of the expanding gases.

According to the invention, efficient mileage conditions are provided with less pollution emitted. The uniform and even distribution of fuel to the intake manifold also provides for good low end torque as well as in all other rpm ranges. In addition, the mixing paths will usually retain an unused mixture therein from the last engine operation so that the engine will start immediately without dumping raw fuel into the combustion areas. Furthermore, the efficient fuel mixture causes the engine to burn cleaner and it will thus have longer life and better performance. Since the mixing system of the invention is on the outlet side of the carburetor, the system does not interfere with regulation of any of the existing carburetor adjustments such as the adjustments for richness and leanness. The system similarly does not interfere with the operation of the PCV and EGR valves or automatic choke and accelerator pump, or the pollution equipment.

It is to be understood that the forms of my invention herein shown and described are to be taken as preferred examples of the same and that various changes in the shape, size and arrangement of parts may be resorted to without departing from the spirit of my invention, or the scope of the subjoined claims. For example, the system may comprise an integral part of the carburetor for new installations, and furthermore, the system may eliminate altogether the use of a carburetor since it may be associated with fuel inlet means thereto and provide all the necessary fuel mixing to the intake manifold.

Having thus described my invention, I claim:

1. Fuel treating apparatus for internal combustion engines of the type having fuel feed means with an outlet and arranged to feed fuel to an intake manifold and also having an exhaust manifold, said fuel treating apparatus comprising
   (a) air-fuel mixing means arranged to be mounted between the fuel feed means of an engine and an intake manifold,
   (b) said air-fuel mixing means comprising a housing having an inlet arranged to be connected to the fuel feed means and an outlet arranged to be connected to the intake manifold,
   (c) said housing having a straight path therethrough for passage of fuel and air from fuel feed means of an engine to an intake manifold,
   (d) said path having an outer defining surface provided with a spiral groove and ridges confining said groove to develop a swirling motion through said path to subject the fuel and air to centrifugal action for atomizing the fuel and air,
   (e) said path opening through the upper end of said housing with a portion of its spiral groove projecting laterally into said path on one side and a portion of its spiral groove providing a recess on the opposite side to efficiently initiate said swirling motion,
   (f) the said path being unobstructed in its area between the groove surface,
   (g) said path being of a cross sectional area arranged to be less than the cross sectional area of the outlet of fuel feed means to provide increased velocity through said spiral path for increasing the mixing time and turbulence of fuel and air and expansion of the fuel and air mixture,
   (h) said outer defining surface of said path, which consists of said spiral groove and confining ridges, including a roughened sand type like finish to increase the agitation and atomization of the fuel mixture,
   (i) and an outer casing on said housing providing circulation of a heating medium to offset the refrigeration effect of the expanding mixture.

2. Fuel treating apparatus for internal combustion engines of the type having fuel feed means with an outlet and arranged to feed fuel to an intake manifold and also having an exhaust manifold, said fuel treating apparatus comprising
   (a) air-fuel mixing means arranged to be mounted between the fuel food means of an engine and an intake manifold,
   (b) said air-fuel mixing means comprising a housing having an inlet arranged to be connected to the fuel feed means and an outlet arranged to be connected to the intake manifold, (c) a spiral path interiorly of said housing providing a swirling intermixing action between the fuel and air, (d) said path being of a cross sectional area arranged to be less than the cross sectional area of the outlet of fuel feed means to provide increased velocity through said spiral path for increasing the mixing time and turbulence of fuel and air, (e) said path being defined by roughened wall surfaces to increase the agitation and atomization of the fuel mixture, (f) an insert arranged to be mounted between a fuel feed means and an intake manifold, (g) said insert comprising a first compartment arranged to direct fuel from the fuel feed means to said inlet of said tubular housing, (h) a second compartment arranged to direct air-fuel mixture from the outlet of said tubular housing to the intake manifold, (i) a baffle plate separating said first and second compartments, (j) and valve means in said baffle plate arranged to be operated by selected conditions of vacuum in the intake manifold and also arranged to be opened only by decreased vacuum in the intake manifold whereby upon decreased vacuum in the intake manifold, fuel from the fuel feed means is admitted from the fuel feed means into the outlet of said housing for direct passage into the intake manifold.

* * * * *